(12) United States Patent
Stikkelorum

(10) Patent No.: US 9,409,725 B2
(45) Date of Patent: Aug. 9, 2016

(54) DEVICE FOR SORTING PRODUCTS

(75) Inventor: Simon Gerardus Stikkelorum, Haps (NL)

(73) Assignee: VANDERLANDE INDUSTRIES B.V., Veghel (NL)

(*) Notice: Subject to any disclaimer, the term of this patent is extended or adjusted under 35 U.S.C. 154(b) by 410 days.

(21) Appl. No.: 13/696,108

(22) PCT Filed: Apr. 29, 2011

(86) PCT No.: PCT/NL2011/050295
§ 371 (c)(1),
(2), (4) Date: Feb. 4, 2013

(87) PCT Pub. No.: WO2011/139147
PCT Pub. Date: Nov. 10, 2011

(65) Prior Publication Data
US 2013/0126304 A1    May 23, 2013

(30) Foreign Application Priority Data
May 6, 2010    (NL) ..................................... 2004675

(51) Int. Cl.
*B65G 47/40* (2006.01)
*B65G 47/96* (2006.01)

(52) U.S. Cl.
CPC .............. *B65G 47/40* (2013.01); *B65G 47/962* (2013.01)

(58) Field of Classification Search
CPC .................................................... B65G 47/962
USPC ............. 198/370.04, 370.01, 377.02, 370.03, 198/621.3; 209/707
See application file for complete search history.

(56) References Cited

U.S. PATENT DOCUMENTS

| 4,846,335 A * | 7/1989 | Hartlepp ................... 198/370.04 |
| 5,732,439 A * | 3/1998 | Cipolla ............................ 15/334 |
| 6,193,074 B1 * | 2/2001 | Baum et al. .................... 209/606 |

(Continued)

FOREIGN PATENT DOCUMENTS

| EP | 0960838 A1 | 12/1999 |
| EP | 1411008 A1 | 4/2004 |
| EP | 1447359 A2 | 8/2004 |

OTHER PUBLICATIONS

Search Report for Dutch Patent Application No. 2004675; Feb. 9, 2011.

(Continued)

*Primary Examiner* — Gene Crawford
*Assistant Examiner* — Lester Rushin
(74) *Attorney, Agent, or Firm* — Barnes & Thornburg LLP

(57) ABSTRACT

A device for sorting products having carrier units arranged adjacent to each other and conveying means for supporting and conveying the carrier units. Each carrier unit has a support platform, support means for supporting the support platform, leg members supported by the conveying means and tiltably supporting the support means, and tilting means for tilting the support means relative to each other about a tilt axis extending parallel to the conveying path. The tilting means has at least one cam and drive means having an electric motor supported by the conveying means for rotating the at least one cam relative to the leg members about an axis of rotation, as well as a camway which is rigidly connected to the support means and with which the at least one cam mates upon rotation of the at least one cam about the axis of rotation. The tilt axis is located between the axis of rotation and the support platform.

14 Claims, 5 Drawing Sheets

(56) References Cited

U.S. PATENT DOCUMENTS

| | | | |
|---|---|---|---|
| RE37,747 E * | 6/2002 | van den Goor | 198/370.04 |
| 6,874,614 B2 * | 4/2005 | Heitplatz | 198/370.04 |
| 2011/0247663 A1 * | 10/2011 | Gadini et al. | 134/115 R |

OTHER PUBLICATIONS

Search Report for International Patent Application No. PCT/NL2011/050295; Sep. 1, 2011.

* cited by examiner

DEVICE FOR SORTING PRODUCTS

PRIORITY CLAIM

This patent application is a U.S. National Phase of International Patent Application No. PCT/NL2011/050295, filed 29 Apr. 2011, which claims priority to Dutch Patent Application No. 2004675, filed 6 May 2010, the disclosures of which are incorporated herein by reference in their entirety.

FIELD

Disclosed embodiments relate to a device for sorting products, comprising carrier units arranged adjacent to each other, conveying means for supporting and conveying the carrier units in a conveying direction along a conveying path, each carrier unit comprising a support platform, support means for supporting the support platform, leg members supported by the conveying means and tiltably supporting the support means, and tilting means for tilting the support means relative to each other about a tilt axis extending parallel to the conveying path, the tilting means comprising at least one cam and drive means comprising an electric motor supported by the conveying means for rotating the at least one cam relative to the leg members about an axis of rotation spaced from the at least one cam by some distance, which axis of rotation extends parallel to the tilt axis, as well as at least one camway formed by the support means, with which the at least one cam mates upon rotation of the at least one cam about the axis of rotation for tilting the support means and the associated support platform.

BACKGROUND

Such a device is disclosed in European patent application EP-A1-1 411 008. The device described in the document comprises tilting means of relatively compact construction, as appears in particular from FIG. 4 of EP-A1-1 411 008. Accordingly, the support platform is positioned relatively close above the level at which the conveying means support the leg members. However, there may also be reasons which it is desirable that the support platforms be spaced a greater distance above the level of the support means. Such a reason may be the fact that cheeks are used on the facing ends of the support platforms, such as those described in European patent application EP-A1-960838. The cheeks are indicated at 6 and 8 in the aforesaid document. During tilting of a support platform provided with the associated cheeks, the downwardly extending cheeks need space.

SUMMARY

Disclosed embodiments provide a device as described in the introduction, in which the support platforms are located at a relatively high level. In order to accomplish that, the disclosed embodiments have a tilt axis that is located between the axis of rotation and the support platform. In comparison with the situation according to the prior art, the relative positions of the rotation axis and the tilt axis are reversed, therefore, so that height is gained, whilst in addition the center of gravity of the carrier units, including the associated electric motor, can be low. The latter is advantageous because the occurrence of undesirable mass inertia effects is prevented. For the sake of clarity it is noted as an aside that the disclosed embodiments do not exclude the situation in which the electric motor is supported by the conveying means via the leg members.

The advantages of the disclosed embodiments apply, in particular, if the center of gravity of the electric motor is located on the side of the axis of rotation remote from the support platform. In practice this means that the center of gravity of the electric motor is located relatively close to the conveying means, or, in other words, relatively low, so that the contribution of the electric motor to the magnitude of the mass inertia effects is limited.

BRIEF DESCRIPTION OF THE FIGURES

The disclosed embodiments will now be explained in more detail by means of a description of the device in which reference is made to the following figures.

DETAILED DESCRIPTION

Figure 1:
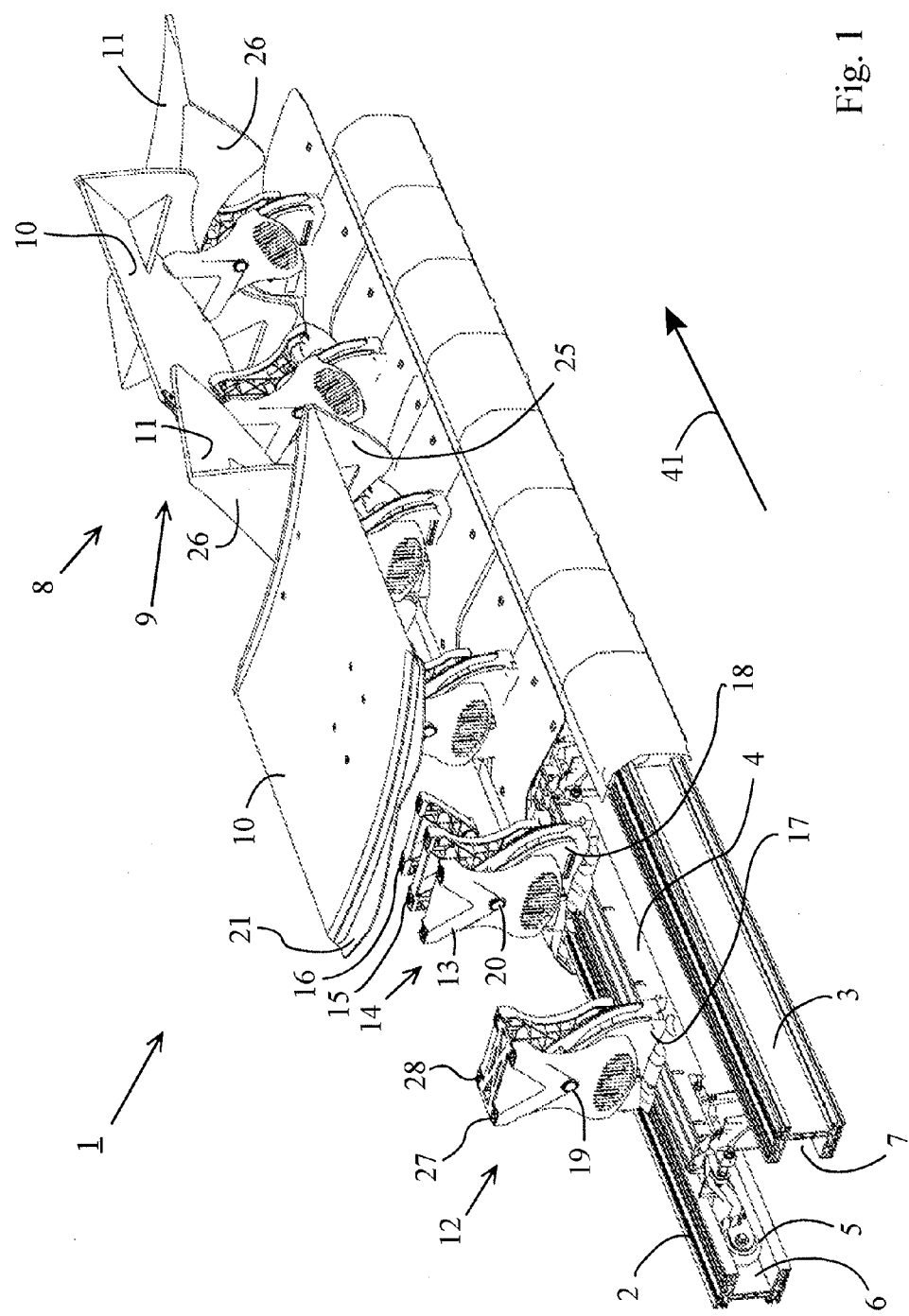
FIG. 1 shows a part of a sorting device.

The electric motor optionally has an outgoing shaft which is oriented perpendicular to the tilt axis. The electric motor and thus takes up as little space as possible, seen in the conveying direction.

In particular, but not exclusively, in combination with the preceding disclosed embodiment, the electric motor may be provided in a housing of a leg member. The electric motor is thus screened, so that the electric motor will be less vulnerable, whilst in addition the appearance of the device can be positively influenced.

The advantages readily come to the fore in particular if, according to another disclosed embodiment, the tilt axis is located between the path that the at least one cam follows about the axis of rotation during rotation and the support platform.

Optionally, the tilting means comprise two cams which are jointly rotatable about the axis of rotation, during which rotation on one side of the neutral position one of the cams moves along one of two camways and during which rotation on the other side of the neutral position the other one of the cams moves along the other one of the two camways.

For safety reasons, it is optional in that regard if the support means comprise screening means for screening the path of the cam other than the cam which moves along one of the two camways. In this way undesirable objects, such as parts of products to be sorted, can be prevented from landing in the path of the other (inactive) cam, which might lead to a malfunction.

Optionally, the screening means have the shape of the path of the other cam, so that the amount of space taken up by the screening means remains limited.

For reasons of constructional simplicity, the screening means may join the two camways, so that the screening means and the two camways can form one enclosed area within which the two cams move.

The screening means may comprise a screening edge which defines an area within which the cam other than the cam which is moving along one of the two camways moves just without making contact. The screening means thus take up a minimum amount of space.

The screening means likewise may comprise a screening edge which joins a circumferential edge of at least one camway. Thus, the transition area between the area in which a cam moves in a camway and the area in which a cam moves in a screened area without making contact can be configured with constructionally comparable means.

To prevent products to be sorted from landing between two adjacent support platforms, another disclosed embodiment of a device has adjacent support platforms that join one another at ends facing toward each other, each support platform comprising at least two support platform parts which are movable relative to each other so as to ensure that adjacent support platforms will continue to abut one another while passing through bends. The support platforms in this way jointly form a closed deck at all times.

The advantages come to the fore if the support platforms comprise screening plates at their facing ends, which screening plates extend downward from the support platforms. Such screening plates, also referred to as "cheeks", require height upon tilting of the associated support platform, which height is provided in an advantageous manner.

The creation of a closed deck is in particular realised in a very advantageous manner if each support platform comprises a main support platform part and a bridging support platform part which overlaps the main support platform part on the underside thereof, if the conveying means comprise a train of pivotally interconnected conveying units, and if the main support platform part is supported between the ends thereof by a first support member and, at one end of the support platform in question, by a second support member, whilst the associated bridging support platform part is supported at the opposite end of the support platform in question by a third support member, wherein the leg members, relative to which the first support member and/or the second support member are tiltable, are supported by a conveying unit other than the conveying unit that supports the leg member relative to which the third support member is tiltable.

A further contribution to a support, or to the constructional simplicity, can be realised if the leg member that supports a second support member also supports the third support member associated with an adjacent support platform, and/or if the third support member comprises two support arms that support the bridging support platform part at two different longitudinal positions.

In the latter case, one support arm of the third support member may support the bridging support platform part at the end of the associated support platform and that it supports the other support member at a distance of at least 25% from the end of the support platform.

A stable support of the main support platform part can be obtained in particular if the first support platform comprises two support arms that support the main support platform part or on either side of the leg member that tiltably supports the first support member.

The legs for a number of adjacent carrier units may be provided at least substantially at equally spaced positions, thereby creating a balanced image and a balanced support.

Figure 2:
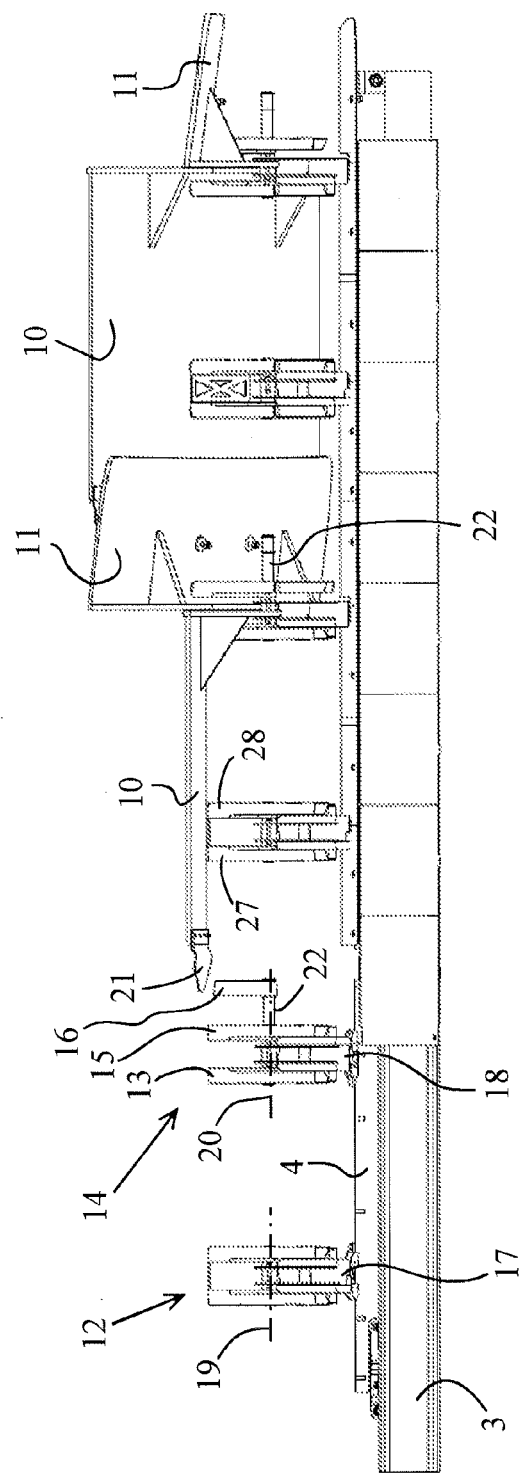
FIG. 2 is a side view of FIG. 1.

FIGS. 1 and 2 show in perspective view and side view, respectively, a part of a sorting device 1. The sorting device 1 comprises two guide sections 2, 3 arranged in opposite mirror image, defining an endless conveying path. The guide sections 2, 3 guide an endless train of conveying units 4 connected for unilateral pivoting movement relative to each other. To that end running wheels 5 forming part of each of the conveying units 4 run in opposite U-shaped grooves 6, 7 of the respective guide sections 2, 3. The number of conveying units 4 corresponds to the number of carrier units 8 yet to be explained below.

Each carrier unit 8 comprises a support platform 9. In FIGS. 1 and 2 the support platform 9 of the left-hand carrier unit 8 is not shown for the sake of clarity. A typical length of a support platform 9 is 120 cm.

Each support platform 9 is made up of a main support platform part 10 and a bridging support platform part 11. The bridging support platform part 11 overlaps the associated main support platform part 10 on the underside thereof along about 10% of the length of the support platform 9, being oriented at a slight inclination, as can be seen on the right-hand side in FIG. 2. The platform parts 10, 11 of each support platform 9 rest on tilting leg members, which thus form support members for the support platforms 9. More specifically, the main support platform part 10 is supported, at a position approximately halfway the length of the support platform 9, on a tilting leg member 12 exclusively provided for that purpose. The tilting leg member 12 has two support arms 27, 28, which are connected at their upper sides.

At an end facing toward an adjacent support platform 9, the main support platform part 10 is also supported by a support arm 13 of a multiple tilting leg member 14. The multiple tilting leg member 14 has two further support arms 15, 16, which support the bridging support platform part 11 at the end of the bridging support platform part 11 that faces toward the main support platform part 10 of an adjacent support platform 9 and at a position about halfway the length of the bridging support platform part 11, respectively. For a clear understanding it is noted that the further support arms 16 for the two compound multiple tilting leg members 14 on the right-hand side in FIG. 2 are not shown in FIG. 2.

A fixed leg 17, 18 is provided for each tilting leg member 12, 14. The tilting leg members 12, 14 are connected to the associated respective fixed legs 17, 18, being tiltable about coaxial tilt axes 19, 20.

The support arm 16 is connected to the other part of the multiple tilting leg member 14 via a shaft member 22, whose central axis coincides with the tilt axes 19, 20. The fixed legs 17, 18 are alternately provided at regular intervals.

Because of the previously described support of each main support platform part 10 by the two tilting leg members 12, 14, the main support platform part 10 and the associated bridging platform part 11 can only tilt jointly about the respective tilt axes 19, 20. In FIGS. 1 and 2, such a tilted situation is shown for one carrier unit 8. Of the support platform 9 located downstream of the tilted support platform 9, only the bridging support platform part 11 is shown, whilst of the downstream support platform 9 only the main support platform part 10 is shown. The support platform parts 10, 11 associated with the two most left-hand (seen in FIG. 1) tilting leg members 12, 14 are not shown by way of illustration of the invention.

The fixed legs 17, 18 are mounted to the conveying units 4, with the respective fixed legs 17, 18 associated with a particular carrier unit 8 not being provided on the same conveying unit 4 but on adjacent conveying units 4. As a result, the platform parts 10, 11 of a particular carrier unit 8 will also pivot about the same pivot axis relative to each other in a horizontal bend in the conveying path, in which adjacent conveying units 4 pivot about a vertical pivot axis relative to each other, as a result of which the closed nature of the deck will be maintained also upon passage through a horizontal bend. The closed deck nature is also maintained in the case of a vertical bend in the conveying path, which occurs in particular at the transition between a horizontal part of the conveying path and an inclined part of the conveying path, because of the overlap of the support platform parts 10, 11. At the end of the main support platform 10 facing the associated bridging support platform part 11, the main support platform part 10 is provided with a flexible sealing flap 21, which prevents a gap being formed between the support platform parts 10, 11 of a support platform 9.

At the ends of each support platform 9, the support platform parts 10, 11, are provided with screening plates 25, 26, respectively, which extend downward from the associated support platform parts 10, 11. The screening plates 25, 26 of adjacent carrier units 8 butt together, thereby preventing the formation of a gap between the support platforms 9 of the various carrier units 8. As a result, the upper side of the support platforms 9 of the successive carrier units 8 form a closed deck, whilst in addition the screening plates 25, 26 prevent an opening being formed between the bottom side of a support platform 9 and the upper side of an adjacent support platform 9 upon tilting of one of the two support platforms 9, into which opening products to be sorted or parts thereof might find their way, which could lead to problems when the tilted support platform 9 tilts back to its neutral position.

Each carrier unit 8 is provided with tilting means for tilting a support platform 9 about the tilt axis 19, 20. The tilting means are provided in the housings of the fixed leg 17 and the tilting leg member 12. The construction of the tilting means and their operation will be explained hereinafter with reference to FIGS. 3a-3d.

Present inside the housing of the fixed leg 17, disposed transversely therein, is an electric motor 31 provided with an outgoing shaft 32, which drives an external screw thread 33. The outgoing shaft 32 extends perpendicularly to the conveying direction 41 of the sorting device 1. The electric motor 31 causes the cam wheel 34 to rotate about the axis of rotation 35. As an aside it is noted that tilting of the support platform 9 between two extreme tilted positions in the disclosed embodiment is accompanied by rotation of the cam wheel 34 through an angle of rotation of about 210 degrees. A full rotation does not take place, therefore.

The cam wheel 34 is in engagement with a first transmission gear 36a which is mounted on a common rotary shaft as a second transmission gear 36b whose diameter is larger than that of the first transmission gear 36a. The first transmission gear 36a is in engagement with screw thread 33. Actuation of the electric motor 31 will therefore result in rotation of the cam wheel 34 about the axis of rotation 35 via, successively, the screw thread 33, the second transmission gear 36b and the first transmission gear 36a.

Figure 3A:
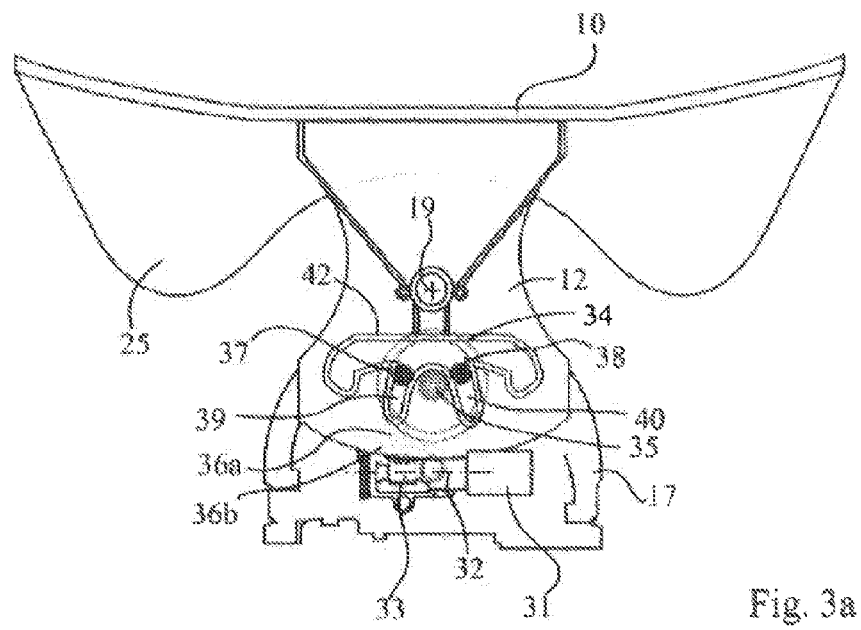
FIGS. 3A-3E show five successive stages of a carrier unit forming part of a device as shown in FIG. 1 during tilting thereof.
Figure 3B:
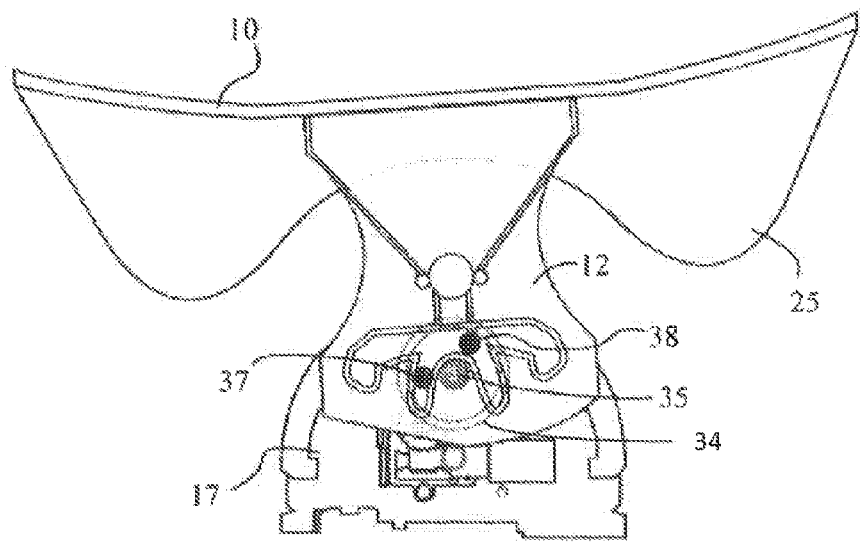
Figure 3C:
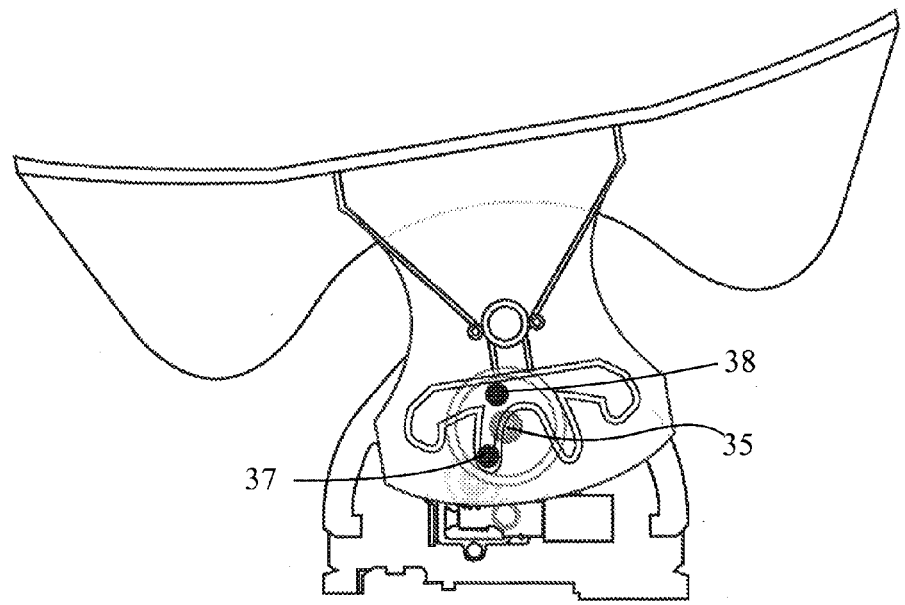
Figure 3D:
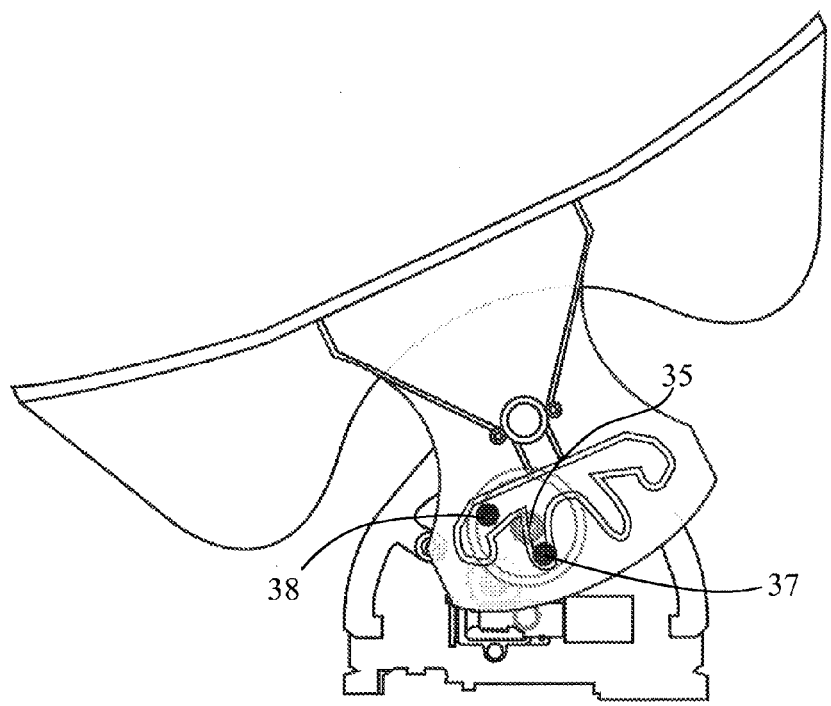
Figure 3E:
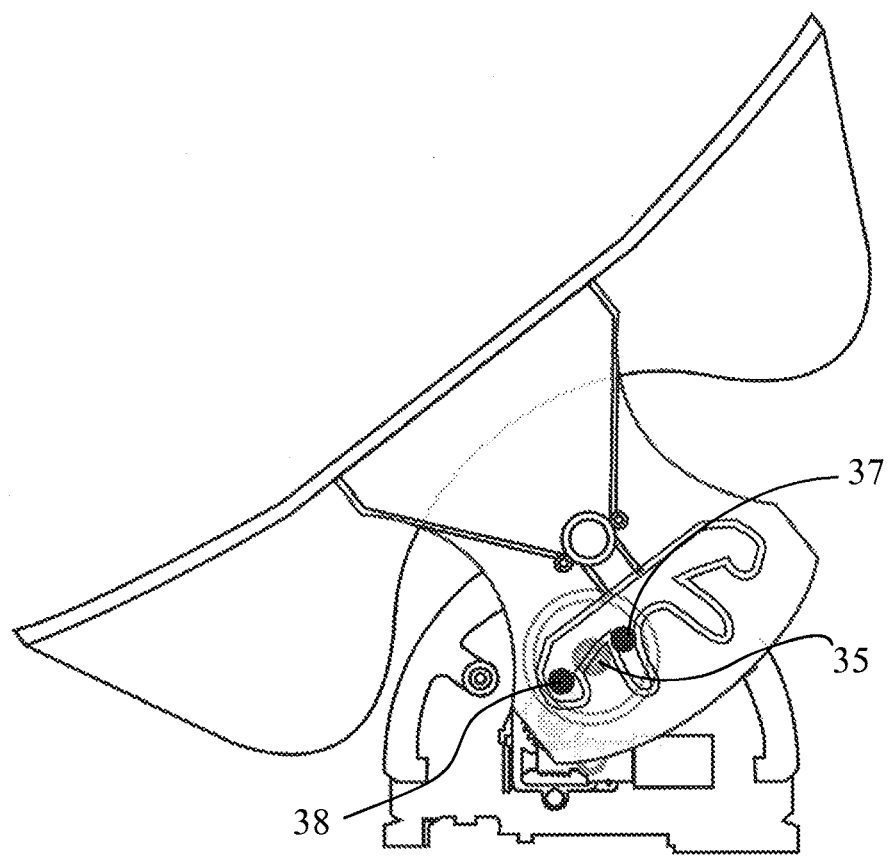

Provided on one of the two side faces of the cam wheel 34 are two cams 37, 38, which cams extend parallel to the conveying direction 41, in a neutral position as shown in FIG. 3a, the ends of the cams 37, 38 extend within two camway portions 39, 40, which are provided on the tilting leg member 12. In the neutral position, the cams 37, 38 are positioned slightly above the level of the axis of rotation 35, in mirror symmetry with a vertical plane of symmetry that extends through the axis of rotation 35, parallel to the conveying direction 41. Anti-clockwise rotation of the cam wheel 34 in FIGS. 3a-3e upon suitable actuation of the electric motor 31 will cause the cam 37 to move into the camway portion 39, resulting in tilting to the left of the tilting leg member 12, and thus of the main support platform part 10, and thus also of the bridging support platform part 11 associated with the same support platform 9, about the tilt axis 19, 20. The cam 38, on the other hand, will become detached from the camway portion 40, but the cam 38 will remain screened from its environment on account of the presence of a screening edge 42, which joins the edges of the camway portions 39, 40, thus defining such an area therein that the cam 40 can just move without making contact with the screening edge 42. Upon tilting of the support platform 9 between the neutral position shown in FIG. 3a and the extreme position shown in FIG. 3e, the cam 37 moves up and down along the length of the camway portion 39. The skilled person will appreciate that the electric motor 37 must be driven in the reverse direction to effect tilting of the support platform 9 to the right, as a result of which the cam 38 will move up and down within the camway portion 40, whilst the cam 37 moves inactively within the area defined by the screening edge 42. Upon tilting of the support platform 9 between the neutral position shown in FIG. 3a and the extreme position shown in FIG. 3e, the cam 37 moves up and down along the length of the camway portion 39. The skilled person will appreciate that the electric motor 37 must be driven in the reverse direction to effect tilting of the support platform 9 to the right, as a result of which the cam 38 will move up and down within the camway portion 40, whilst the cam 37 moves inactively within the area defined by the screening edge 41.

When products supported on the support platform 9, normally on the main support platform part 10 thereof, are to be sorted out, the electric motor 31 of a particular carrier unit 8 receives a control signal from a control system (not shown), as a result of which the support platform 9 will tilt in a particular direction, such that the product present thereon will slide off the support platform 9 at a sort-out location, where a chute may be provided, for example.

The invention claimed is:

1. A device for sorting products, the device comprising:
carrier units arranged adjacent to each other;
conveying means for supporting and conveying the carrier units in a conveying direction along a conveying path, each carrier unit comprising a support platform;
support means for supporting the support platform;
leg members supported by the conveying means, which tiltably support the support means and
tilting means for tilting the support means of each carrier unit relative to each other about a tilt axis extending parallel to the conveying path, the tilting means comprising at least one cam and drive means comprising an electric motor supported by the conveying means for rotating the at least one cam relative to the leg members about an axis of rotation spaced from the at least one cam by some distance, which axis of rotation extends parallel to the tilt axis, as well as at least one camway formed by the support means, with which the at least one cam mates upon rotation of the at least one cam about the axis of rotation for tilting the support means and the associated support platform,
wherein the tilt axis is located between the axis of rotation and the support platform, wherein the tilting means comprise two cams which are jointly rotatable about the axis of rotation, during which rotation on one side of a neutral position one of the cams moves along one of two camways and during which rotation on the other side of the neutral position the other one of the cams moves along the other one of the two camways.

2. The device of claim 1, wherein the support means defines the path of one of the two cams that is not the cam moving along one of the two camways.

3. The device of claim 2, wherein the support means have the shape of the path of the other cam.

4. The device of claim 2, wherein the support means join the two camways.

5. The device of claim 1, wherein the support means comprise an edge which defines an area within which the cam other than the cam which is moving along one of the two camways moves just without making contact.

6. The device of claim 1, wherein the support means comprise an edge which joins a circumferential edge of at least one camway.

7. The device of claim 1, wherein the adjacent support platforms join one another at ends facing toward each other, each support platform comprising at least two support platform parts which are movable relative to each other so as to ensure that adjacent support platforms will continue to abut one another while passing through bends.

8. The device of claim 6, wherein the support platforms comprise screening plates at their facing ends, which screening plates extend downward from the support platforms.

9. The device of claim 7, wherein each support platform comprises a main support platform part and a bridging support platform part which overlaps the main support platform part on the underside thereof, that the conveying means comprise a train of pivotally interconnected conveying units, and that the main support platform part is supported between the ends thereof by a first support member and, at one end of the support platform in question, by a second support member, while the associated bridging support platform part is supported at the opposite end of the support platform in question by a third support member, wherein the leg members, relative to which the first support member and/or the second support member are tiltable, are supported by a conveying unit other than the conveying unit that supports the leg member relative to which the third support member is tiltable.

10. The device of claim 9. wherein the leg member that supports a second support member also supports the third support member associated with an adjacent support platform.

11. The device of claim 9, wherein the third support member comprises two support arms that support the bridging support platform part at two different longitudinal positions.

12. The device of claim 11, wherein one support member of the third support member supports the bridging support platform part at the end of the associated support platform and that it supports the other support member at a distance of at least 25% from the end of the support platform.

13. The device of claim 7, wherein the first support platform comprises two support arms that support the main support platform part or on either side of the leg member that tiltably supports the first support member.

14. The device of claim 1, wherein the leg members for a number of adjacent carrier units are provided at least substantially at equally spaced positions.

* * * * *